(12) United States Patent  (10) Patent No.: US 8,891,375 B2
Wang et al.  (45) Date of Patent: Nov. 18, 2014

(54) SYSTEM AND METHOD FOR VIRTUAL ETHERNET INTERFACE BINDING

(75) Inventors: Xin Wang, San Jose, CA (US); Cesare Cantù, Santa Clara, CA (US); Ravi Kumar Gadde, San Jose, CA (US); Palathingal Frank, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 191 days.

(21) Appl. No.: 13/565,087

(22) Filed: Aug. 2, 2012

(65) Prior Publication Data

US 2014/0036675 A1  Feb. 6, 2014

(51) Int. Cl.
*H04L 1/00*  (2006.01)
*G06F 9/52*  (2006.01)

(52) U.S. Cl.
CPC .......................................... *G06F 9/52* (2013.01)
USPC ............................. 370/235; 370/254; 370/351

(58) Field of Classification Search
CPC ......... H04L 47/10; H04L 47/35; H04L 47/32; H04L 47/20
USPC ......................................................... 370/252
See application file for complete search history.

(56) References Cited

U.S. PATENT DOCUMENTS

| 2008/0288661 | A1* | 11/2008 | Galles ............................. 710/3 |
| 2011/0085569 | A1* | 4/2011 | Gnanasekaran et al. ...... 370/419 |
| 2012/0002535 | A1* | 1/2012 | Droux et al. .................. 370/216 |
| 2012/0159481 | A1 | 6/2012 | Anderson et al. |
| 2013/0336134 | A1* | 12/2013 | Bao et al. ...................... 370/252 |

FOREIGN PATENT DOCUMENTS

WO  WO-2014022168 A1  2/2014

OTHER PUBLICATIONS

International Application Serial No. PCT/US2013/051835, International Search Report mailed Nov. 4, 2013, 5 pgs.
International Application Serial No. PCT/US2013/051835, Written Opinion mailed Nov. 4, 2013, 7 pgs.
"Virtual Bridged Local Area Networks—Bridge Port Extension Sponsored by the LAN/MAN Standards Committee", IEEE 8G2.1BR, XP055084599, Retrieved from the Internet: <http://ieeexplore.i  eee.org/stampPDF/getPDF.jsp?tp=&arnumber=6239543>, (Jul. 16, 2012), 135 pgs.

* cited by examiner

*Primary Examiner* — Andrew Lai
*Assistant Examiner* — Jamaal Henson

(57) ABSTRACT

A method and network device (e.g., a switch) is described for assigning virtual Ethernet bindings. The method may comprise accessing the network device to obtain information related to hardware (e.g., switching hardware) of the network device. Thereafter, an uplink binding from a plurality of physical uplinks is selected based on the information. A virtual network interface of a virtual machine is then mapped to the selected uplink binding.

24 Claims, 5 Drawing Sheets

SYSTEM AND METHOD FOR VIRTUAL ETHERNET INTERFACE BINDING

FIELD

The subject matter disclosed herein generally relates to binding virtual Ethernet interfaces. Example embodiments describe methods and systems for binding a virtual Ethernet interface to provide uplink assignments for virtual machines.

BACKGROUND

With the advent of server virtualization, two basic assumptions of data center network design have changed. Firstly, multiple operating system (OS) images (or virtual machines) are now allowed to transparently share the same physical server and I/O devices and, secondly, the relationship between an OS image and a network is now dynamic. The access layer of the network may support local switching between different virtual machines within the same server, thus invalidating the traditional assumption that each network access port corresponds to a single physical server running a single image. Further, each virtual machine may be moved from one physical server to another within the data center or even across data centers.

BRIEF DESCRIPTION OF THE DRAWINGS

Some embodiments are illustrated by way of example and not limitation in the figures of the accompanying drawings, in which.

DESCRIPTION OF EXAMPLE EMBODIMENTS

Overview

Virtual Machines (VMs) may be migrated across different physical servers to satisfy resource constraints in a data center or to achieve user specified goals, such as maximizing application performance. When VMs are repositioned, the required Virtual Local Area Networks (VLANs) that are configured on a destination host may be taken into account.

In an example embodiment, VMs are repositioned by considering finer grain network topology within a VLAN, such as the number and topology of physical paths leading to a destination host which carry the required VLANs. Further, in some example embodiments, VMs are repositioned by considering resource utilization and constraints in the physical network. A network/server administrator may choose different virtual Ethernet interface (vEth) bindings (uplink assignments) during bringing up of a new VM and, accordingly, the network traffic source locations and corresponding traffic flows may effectively be changed. In order to efficiently utilize the available computing and network resources as a whole, in an example embodiment, a VM controller may optionally collaborate with a data center switch to collect physical network information and form an enhanced (e.g., an optimal) virtual interface binding.

In an example embodiment, a method of assigning virtual Ethernet bindings is described. The method may comprise accessing a network device to obtain information related to hardware of the network device and selecting an uplink binding from a plurality of physical uplinks based on the information. Thereafter, the method may include mapping a virtual network interface of a virtual machine to the selected uplink binding. The network device may, for example, be a switch and the hardware may thus be switching hardware. The switching hardware may include an application-specific integrated circuit (ASIC) instance of the switch and the information may identify resource constraints of the ASIC. The resource constraints of the ASIC include buffer size information, priority queue information of the ASIC, or any hardware-related information of the ASIC.

Example Embodiments

In the following description, for purposes of explanation, numerous specific details are set forth to provide a thorough understanding of example embodiments. It will be evident to one skilled in the art, however, that the present subject matter may be practiced without these specific details.

Figure 1:
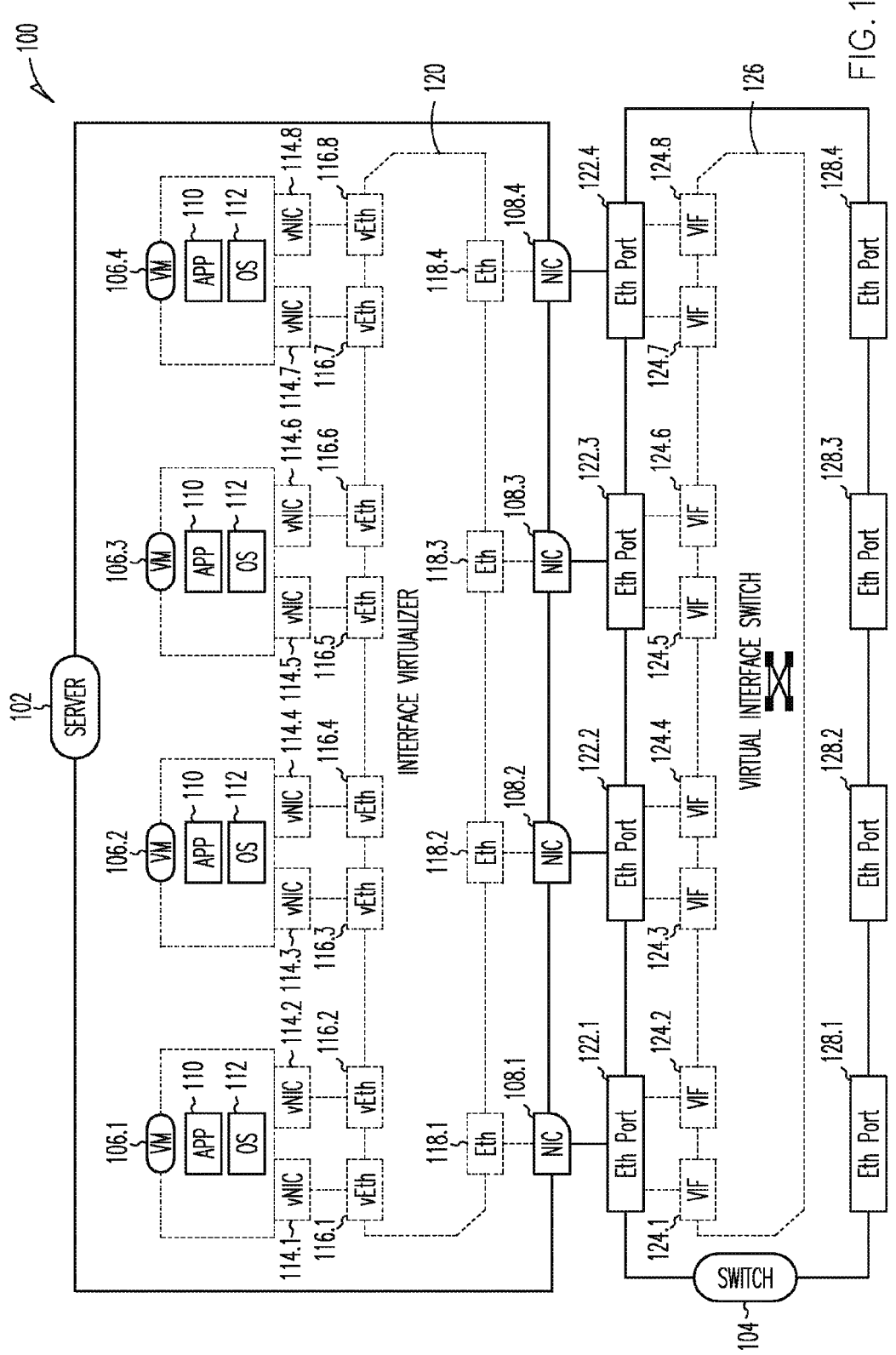
FIG. 1 shows a block diagram of a data center network, in accordance with an example embodiment.

FIG. 1 shows a data center network 100, in accordance with an example embodiment. The network 100 is shown to include one or more servers 102 connected to one or more switches 104. Each server 102 may host a plurality of virtual machines (VM) 106 interfaced to the switch 104 via network interface cards 108. In the example network 100, four virtual machines 106.1-106.4 and four network interface cards (NICs) 108.1-108.4 are shown. Each virtual machine 106 runs a plurality of applications 110 using an operating system 112. It will be appreciated that various different operating systems 112 may be used (e.g., on different servers and/or different virtual machines 106). Likewise, various different applications 110 may be run dependent upon the various functions to be performed by the virtual machine 106. In an example embodiment, the network 100 performs data center functionality and, accordingly, the applications 110 may include data center specific applications.

The network 100 is also shown to include a plurality of virtual Network Interface Cards (vNICs) 114.1-114.8 mapped to a plurality of virtual Ethernet interfaces (vEth) 116.1-116.8. The virtual Ethernet interfaces 116 are mapped to physical Ethernet ports 118.1-118.4 of the Network Interface Cards 108 via an interface virtualizer 120. The Network Interface Cards 108 are physically connected to Ethernet Ports 122.1-122.4, and each Ethernet Port 122.1-122.4 is mapped to a Virtual Interface (VIE) 124.1-124.8 of a Virtual Interface Switch 126. The Ethernet Ports 128.1-128.4 may be connected to various other networked devices (e.g., storage devices in a data center network).

Figure 2:
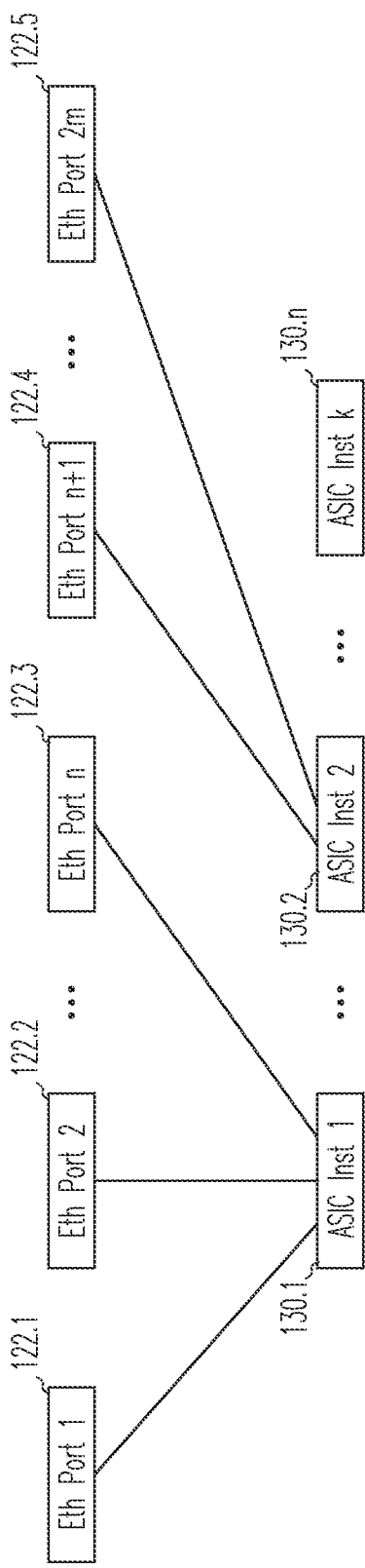
FIG. 2 shows a block diagram of mapping of a plurality of Ethernet ports to a single ASIC instance, according to an example embodiment.

FIG. 2 shows the mapping of a plurality of Ethernet ports to a single ASIC instance, according to an example embodiment. In the example mapping shown in FIG. 2, Ethernet ports 122.1, 122.2, and 122.3 are shown to be mapped to ASIC instance 130.1, and Ethernet ports 122.4 and 124.5 are shown to be mapped to ASIC instance 130.2. It is, however, to be appreciated that different mappings between a plurality of Ethernet ports and a single ASIC instance may be provided.

Thus, in an example embodiment, a single ASIC instance is mapped to more than one Ethernet port. Further, during virtual Ethernet interface binding, hardware aspects of one or more ASIC instances may be taken into account, as described.

Figure 3:
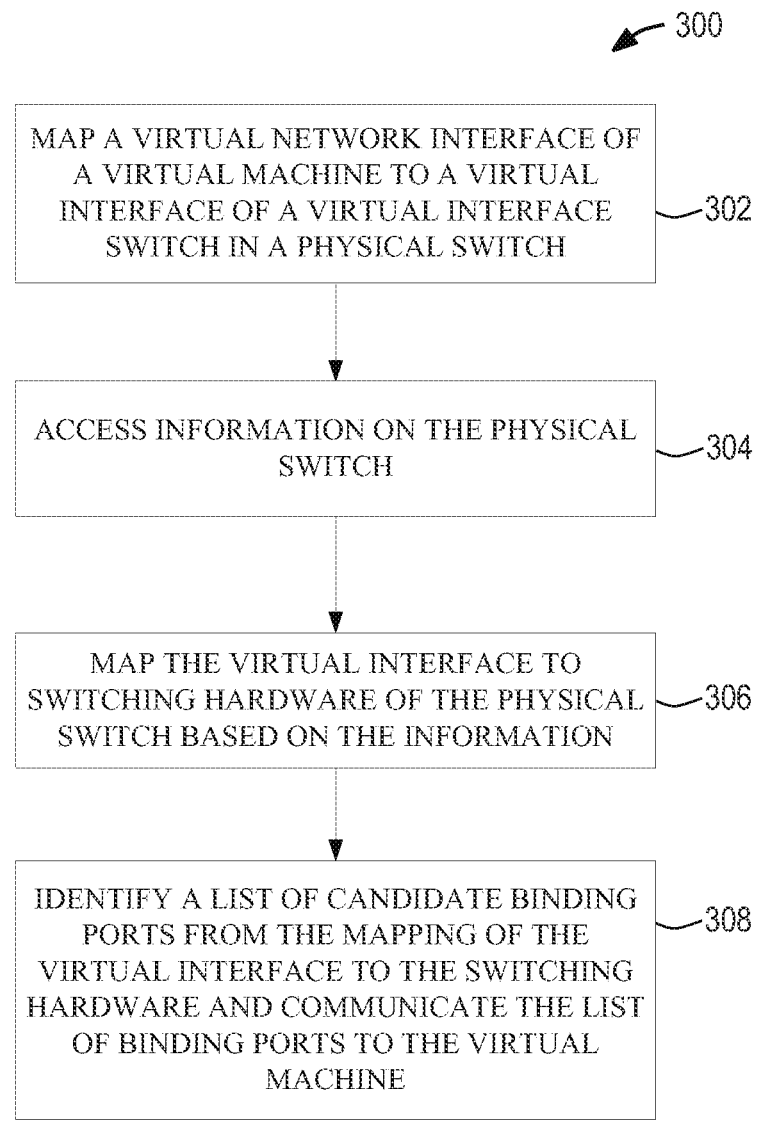
FIG. 3 shows a flow diagram of a method, in accordance with an example embodiment, of assigning virtual Ethernet bindings.

Referring to FIG. 3, a block diagram of a method 300, in accordance with an example embodiment, of assigning virtual Ethernet bindings is shown. The method 300 may be deployed in the network 100 and, accordingly, is described by way of example with reference thereto.

As shown at block 302, the method 300 may access a network device to obtain information related to hardware of the network device. Thereafter, as shown at block 304, an uplink binding may be selected from a plurality of physical uplinks based on the information. The method 300 may then map a virtual network interface of a virtual machine (e.g., the virtual machine 106.1) to the selected uplink binding. As mentioned above, the method 300 may be deployed in the network 100. In an example embodiment the network device is a switch (e.g., the switch 104) and the hardware is switching hardware (e.g., the ASIC 130.1 shown in FIG. 2) of the switch 104. The virtual network interface may be the VIF 124.1, the virtual machine may be the VM 106.1, the virtual interface switch may be the virtual interface switch 126, and the physical switch may be the switch 104. A list of candidate binding ports on the switch 104 may thus be identified. As shown in FIG. 2, a plurality of Ethernet ports (e.g., the Ethernet Port 122.1) may be mapped to a single ASIC instance (e.g., the ASIC instance 130.1).

The intimation on the physical switch (or other network device) may include resource constraints of the ASIC (e.g., the ASIC instances 130.1-130.k). For example, the resource constraints of the ASIC may include buffer size information or priority queue information of the ASIC. The information may, in addition or instead, include Cost of Service (COS) constraints distributed across different ASIC instances (e.g., across ASIC instances 130.1-130.k). It is, however, to be appreciated that the information can include any resource constraint of the switching hardware. In an example embodiment, the resource constraints identify bandwidth constraints of individual ports of the switching hardware (e.g., bandwidth constraints of the Ethernet Ports 122). The bandwidth constraints identified on the switch 104 may be static bandwidth constraints and/or dynamic bandwidth constraints. In an example embodiment, the information includes resource utilization and/or constraints in the physical network of which the switch 104 forms a part. Other resource constraints include available unicast/muiticast forwarding entries, available ternary content addressable memory (TCAM) entries, available interface index translation table entries, available Media Access Control Address (MAC address) table entries, and so on.

In an example embodiment, the virtual Ethernet bindings are assigned during bringing up of a new virtual machine (e.g., the virtual machines 106.1-106.4 of FIG. 1) and the physical switch (e.g., the switch 104) is part of a data center. The method 300 may then include a step wherein a virtual machine controller queries the physical switch (e.g., the switch 104) to access information on the physical switch (e.g., the switch 104). It should however be noted that the methods and apparatus described herein are not limited to the use of a virtual machine controller and, accordingly, example embodiments operate independently of any virtual controller. Thus, in example embodiments, the information on the physical switch (e.g., the switch 104) identifies a list of interfaces available to the virtual machines (e.g., the virtual machines 106.1-106.4) and a plurality of interfaces may be mapped independently of any virtual machine controller.

In an example embodiment, the method 300 optionally includes identifying a plurality of network devices such as switches (e.g., a number of the switches 104) in a layer 2 domain to which a virtual machine (e.g., a virtual machine 106.1-106.4) is to be bound. Each of the plurality of switches identified may be accessed to obtain information on each associated physical switch (e.g., hardware information on one or more ASIC instances in the switch). A plurality of virtual interfaces (e.g., the virtual interfaces 124.1-124.8) may be configured on each switch based on the information. The switching hardware may include plurality of switch ASIC instances of the plurality of physical switches. The information may include a number and topology of physical paths associated with the virtual network interface.

It should be noted that the network device in which example embodiments may be deployed is not limited to a switch, but may be any network device that supports direct connections to virtual interfaces.

A virtual network interface card 114 or virtual host bus adapter (vHBA) may thus logically connect a virtual machine 106 to a virtual interface 124 on a fabric interconnect and allow the virtual machine 106 to send and receive traffic through that interface. Each virtual network interface card 114 (e.g., vNICs 114.1-114.8) in the virtual machine 106 (e.g., VM 106.1-106.4) corresponds to a virtual interface 124 (124.1-124.8) in the fabric interconnect. This may be accomplished by using both Ethernet and. Fibre Channel end-host modes and pinning MAC addresses and World Wide Names for both physical and virtual servers at the interconnect uplink interfaces. In an example embodiment, this is implemented by the network interface virtualizer 120. In the network interface virtualizer 120, switching functions may be performed by the hardware switch (e.g., the switch 104). However, the host adapters on the server 102 may run the interface virtualizer 120. The interface virtualizer 120 may tag each of the packets with a unique tag, known as a virtual network tag (VNTag) for outgoing traffic and remove the VNTag and direct the packet to the specified vNIC (e.g., the vNICs 114.1-114.8) for incoming traffic.

As shown FIG. 1, each vEthernet interface 116.1-116.8 is shown to be mapped one-to-one to a virtual network interface card 114.1-114.8 In the context of mapping a virtual interface 124 to a vEthernet interface 116, the following two combinations may be provided. Firstly, one virtual network interface card 114 is mapped to one vEthernet interface 116 which is, in turn, mapped to to one virtual interface 124. Secondly, in an FEX Active-Active VPC topology where NIV Active-Standby failover is enabled, such as with the Cisco VM-FEX feature, then one virtual network interface card 114 may be mapped to one vEthernet interface 116 and to multiple virtual interfaces 124. One vEthernet interface 116 representing a virtual network interface card 114 may have multiple virtual interfaces 124, where each virtual interface 124 is a different path between the switch 104 and the adapter. An active uplink (VIE 124) for a virtual network interface card 114 may be selected based on a static policy irrespectively of the information available at the switch 104 or of the physical network resources utilization. Thus, in an example embodiment, the interface mapping logic may he vNIC 114->VIF 124 (HIF interface->fabric uplink)->Switch ASIC instance 130 (see FIGS. 1 and 2).

In an example embodiment, the virtual Ethernet interface uplink binding selection sequence may include the following operations:

1. A virtual machine controller may select host and uplink bindings based on the information provided by one or more switches (e.g., the switch 104);

2. Given a target host, a virtual machine controller may select uplink bindings among multiple physical uplinks connected to the host based on the information provided by the switches (e.g., the switch 104); and
3. In an active-standby topology, given a target host, a virtual machine controller may select a preferred active side, and choose uplink binding as indicated in (2).

In an example embodiment where configuration policy information is available through an adapter profile and a switch profile, operations 2 and 3 may be achieved without the intervention of the virtual machine controller. This may allow less communication overhead in, for example, the network 100, and allow the virtual machines 106 to be brought up faster.

In an example embodiment, operation 2 may be implemented in a switch driver (e.g., a Cisco VM-FEX SW driver) and operation 3 may be implemented in a virtual interface adaptor (e.g., a Cisco VIC adapter) independently of any virtual machine controller. Further, example embodiments described herein may be implemented using the 802.1BR standard for Port Extension that defines the framework for host interface ports which are remotely created/destroyed and managed by a physical switch. Example embodiments described herein may also be implemented IEEE 802.1Qbg.

Example embodiments operating in conjunction with a Virtual Interface Control (VIC) protocol may perform the following operations when bringing up a virtual interface (e.g., the virtual interface 124):

1. When a server/network administrator needs to bring up a virtual machine 106 on a hypervisor, instead of selecting a port based on the information available on a virtual machine controller, the administrator may first make a query to all for a sub-set) of data center switches (e.g., the switch 104) in an L2 domain that the virtual machine could migrate to. There may be a number of bandwidth/QoS configuration parameters known only to the switch (e.g., the switch 104) in a policy without the interaction of the virtual machine controller. Examples of these configuration parameters include QoS priority class, rate-limit thresholds, the 802.1p of a virtual-link defined in an adapter profile or port-profile, the bandwidth group of the priority value defined on the switch, and so on. Examples of the information in the policy include interface configuration, port-profile, adapter profile, and so on.

In example embodiments, during assignment of virtual Ethernet bindings the following information available on the switch may be taken into account:

a. For each target virtual machine 106 being brought up, bandwidth group requirements $BW_i$ of each virtual Ethernet interface i (see vEth interfaces 118.1-1118.8) that is associated with a respective virtual machine (see VMs 106.1-106.4) may be taken into account. It should be noted that each virtual Ethernet interface i may also have a rate-limit configuration in terms of an interface policy. If a virtual Ethernet interface 116 has rate-limit configuration that is more restrictive than the bandwidth group, the rate-limit information may be used instead of the bandwidth group requirement.

b. The Cost of Service (CoS) value $CoS_m$ for each virtual Ethernet interface i that belongs to the virtual machine being brought (e.g., one of the VMs 106) up may be determined.

2. Based on the information provided by the virtual machine controller and information provided on the switch, a data center switch (e.g., the switch 104) may translate and maintain the following information:

a. Static and dynamic bandwidth constraints may be taken into account. For a static bandwidth constraint, for each physical link and ASIC instance (e.g., ASIC instances 130), a required subscription ratio may be computed. For example, a sum of a total bandwidth requirements $\Sigma_i BW_{UP_j}^k$ for all virtual Ethernet interfaces i that have been brought up on switch j and ASIC k may be computed. The sum of total bandwidth requirements of a specific traffic class with a specific CoS value $CoS_m$ $\Sigma_m BW_{CoS_{mj}}^k$ that have been brought up on switch j and ASIC k may then be computed. For a dynamic bandwidth constraint, an actual average bandwidth usage, buffer usage, etc. may be computed on each physical link and ASIC instance (e.g., ASIC instances 130). Other ASIC resources (e.g., actual usage of multicast forwarding entries) may also be taken into account.

b. The range of ASIC instances (e.g., ASIC instances 130) $[k_1, \ldots, k_n]$ that may be brought up may depend on server topology (e.g., the server 102 may form part of this topology).

c. A range of switch ports $[p_1, \ldots, p_n]$ on switch j (e.g., the switch 104) that the virtual machine (e.g., the virtual machines 106.1-106.4) could be brought up. The range of available switch ports $[p_1, \ldots, p_n]$ may also be dependent upon the server connection and topology.

3. Thereafter, based on the example information provided above, in an example embodiment, the switch (e.g., the switch 104) may execute an algorithm to select the potential binding interfaces. It will be appreciated that various different algorithms may be executed in different embodiments. An example of such an algorithm is provided below.

In example embodiments where active-standby uplinks may be mapped to dual-home fexes, one virtual Ethernet interface may be bound to two HIF interfaces. Accordingly, the same algorithm may be run on both switches to get two binding lists. It is to be appreciated that the inputs of the two binding calculations ($[p1, \ldots, pn]$ and $[k_1, \ldots, k_n]$) may be different.

4. The switch (e.g., the switch 104) may respond with the list of candidate binding ports to the virtual machine controller, in an example embodiment, the virtual machine controller and the switch may handshake in various cases; for example, the switch may recommend a new placement of a given virtual machine anytime in order to achieve a better overall placement.

5. The virtual machine controller may use that information to select the destination host and the binding. This could be done manually or automatically by the virtual machine controller.

Using the methodologies described herein, one or more switches can enforce a policy associated with the virtual machine interface in the physical network. Further, example embodiments may require no intervention of a virtual machine controller and thus allow for increased speed in bringing up virtual machines.

An example algorithm executed by a switch (e.g., the switch 104) may perform the following operations for each virtual Ethernet interface that has the bandwidth group requirements $BW_i$:

1. Identify which switch in the virtual machine that is to be brought up is physically connected to. If the network virtualization includes active-standby uplinks to dual-home fexes, then the bindings on both switches $[m1, \ldots, m2]$ may be checked after a preferred active side has been selected. In an example embodiment, a virtual Ethernet interface i that uses a minimum total bandwidth may be selected (active side having min $BAT_{UP}$).

2. A decision is then made as to which ASIC instance (e.g., the ASIC instances 130) the virtual interface should be mapped to. For each possible ASIC instance k on switch m, $k[k_1, \ldots, k_n]$, select an ASIC instance k that has minimum total consumed bandwidth $\min_k BW_{UP}$ if multiple ASIC instances have the same total consumed bandwidth. In an example embodiment, with limited buffer and priority queues on a switch ASIC, it may be assumed that higher priority traffic will consume more ASIC resources (e.g., buffer, queues, etc.) resulting in limited hardware resources or potential system bottleneck for the low priority traffic. Accordingly, the total required bandwidth may be checked for traffic that has higher priority (e.g., CoS value) and an ASIC instance that has the least total higher priority traffic may be selected (e.g., ASIC instance k that has $\min_k \Sigma_{m, CoSm \geq CoSi} BW^k_{CoSmj}$). The intersection of all available ports on ASIC k and port range $[p_1, \ldots p_n]$ may be selected as the set of candidate binding ports.

Accordingly, in some example embodiments, a physical switch may provide hardware information to other components in the network (e.g., new information may be provided to a server to configure a virtual machine). For example, hardware information may be used to achieve virtual Ethernet interface binding (uplink assignment) and network resource constraint evaluation. A virtual machine controller, or other components that participate in interface binding to uplinks, can process the hardware information provided by the switch. For example, the processing may take into account the available computing and networking resources during a virtual machine lifecycle so that constraints on both types of resources could be jointly satisfied efficiently. Further, the processing may adjust the virtual interface and physical interface binding according to the virtual machine interface's traffic policies configuration, and spread the virtual interfaces with high bandwidth/QoS requirements across the bridge domain. This may, for example, reduce the likelihood of potential hot-spots.

Figure 4:
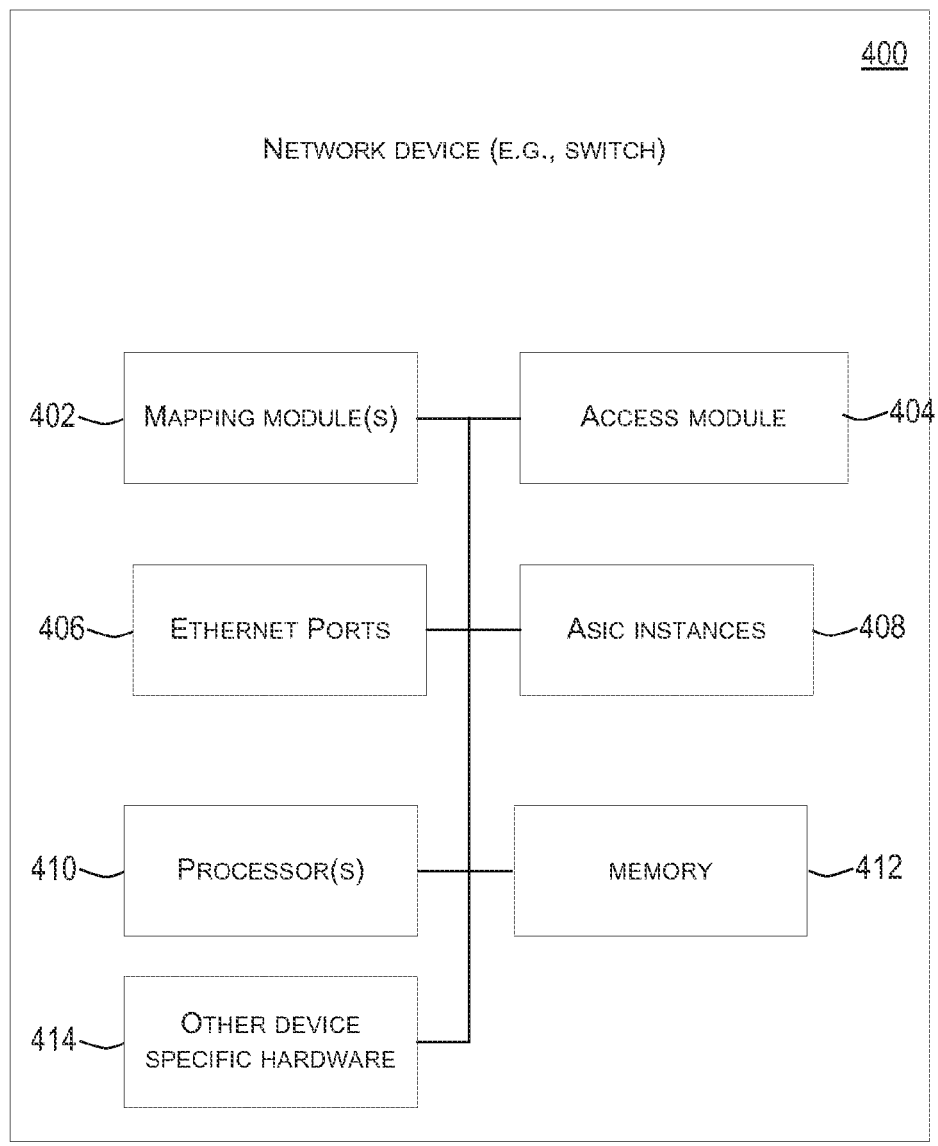
FIG. 4 shows a block diagram of a network device, in accordance with an example embodiment, to map a plurality of Ethernet ports to a single application-specific integrated circuit (ASIC) instance.

FIG. 4 shows a network device 400, in accordance with an example embodiment, to map a plurality of Ethernet ports to a single ASIC instance. The network device 400 may, for example perform the method 300 of FIG. 3, and map the Ethernet Ports 122.1, 122.2, and 122.3 to the ASIC instances 130.1 as shown by way of example in FIG. 2.

The network device 400 is shown to include one or more mapping modules 402, an access module 404, a plurality of Ethernet Ports 406 (e.g., the Eth Ports 122), a plurality of ASIC instances 408 (e.g., the ASIC instances 130), one or more processors 410, memory 412, and various other device specific hardware 414. It is, however, to be noted that one or more of the modules may be located on another device in the system. For example, the mapping module 402 may reside on the server 102.

The access module 404 may access a network device (e.g., the switch 104) to obtain information on hardware (e.g., an ASIC) on the network device. A selection module (which may be a standalone module or included in another module such as the mapping module 402) may select an uplink binding from a plurality of physical uplinks based on the information (e.g., information on the ASIC). The mapping module(s) 402 may be configured to map a virtual network interface (e.g., provided by the virtual network interface cards 114) of a virtual machine (e.g., the virtual machines 106) to the selected uplink binding. The various modules of the network device 400 may be configured by one or more processors executing software or firmware instructions. It should, however, be noted that the network device 400 may perform any one or more of the methodologies described herein.

Figure 5:
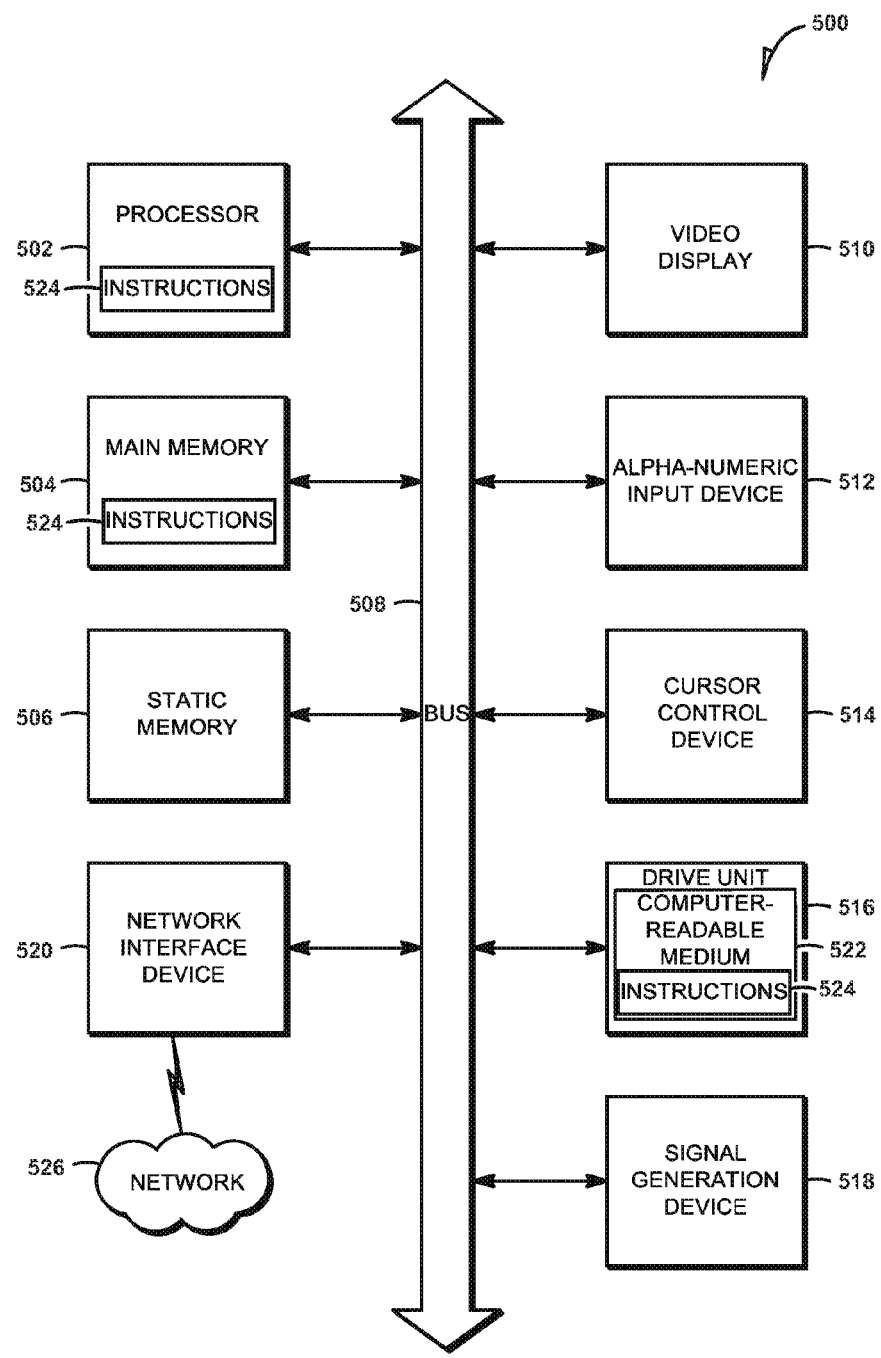
FIG. 5 shows a block diagram of components of a machine, according to some example embodiments, configured to read instructions from a machine-readable medium and perform any one or more of the methodologies discussed herein.

FIG. 5 shows a block diagram illustrating components of a machine 500, according to some example embodiments, able to read instructions from a machine-readable medium e.g., machine-readable storage medium) and perform any one or more of the methodologies discussed herein. For example, the machine 500 may implement the server 102 shown in FIG. 1 and host the virtual machines 106.

More specifically, FIG. 5 shows a diagrammatic representation of the machine 500 in the example form of a computer system and within which instructions 524 (e.g., software) for causing the machine 500 to perform any one or more of the methodologies discussed herein may be executed. In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a cellular telephone, a smartphone, a web appliance, a network router, a network switch, a network bridge, or any machine capable of executing the instructions 524, sequentially or otherwise, that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPV), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The machine 500 may further include a video display 510 (e.g., a plasma display panel (PDP), a light emitting diode (LED) display, a liquid crystal display (LCD), a projector, or a cathode ray tube (CRT)). The machine 500 may also include an alphanumeric input device 512 (e.g., a keyboard), a cursor control device 514 (e.g., a mouse, a touchpad, trackball, a joystick, a motion sensor, or other pointing instrument), a drive unit 516, a signal generation device 518 (e.g., a speaker), and a network interface device 520.

The drive unit 516 includes a machine-readable medium 522 on which is stored the instructions 524 (e.g., software) embodying any one or more of the methodologies or functions described herein. The instructions 524 may also reside, completely or at least partially, within the main memory 504, within the processor 502 (e.g., within the processor's cache memory), or both, during execution thereof by the machine 500. Accordingly, the main memory 504 and the processor 502 may be considered as machine-readable media. The instructions 524 may be transmitted or received over a network 526 via the network interface device 520.

As used herein, the term "memory" refers to a machine-readable medium able to store data temporarily or permanently and may he taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should he taken to include a single medium or multiple media (e.g., a centralized or distributed database, or associated caches and servers) able to store instructions 524. The term "machine-readable medium" shall also be taken to include any medium that is capable of storing instructions (e.g., instructions 524) for execution by a machine (e.g., the machine 500), such that the instructions, when executed by one or more processors of the machine (e.g., processor 502), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

What is claimed is:

1. A method of assigning virtual Ethernet bindings, the method comprising:
   accessing a switch to obtain information related to switching hardware of the switch;
   selecting an uplink binding from a plurality of physical uplink bindings based on the information; and
   mapping a virtual network interface of a virtual machine to the selected uplink binding, wherein a list of candidate binding ports is identified based on the information and the list of candidate binding ports is communicated to the virtual machine.

2. The method of claim 1 wherein the switching hardware includes an Application-Specific Integrated Circuit (ASIC) instance of the switch.

3. The method of claim 2, wherein the information includes resource constraints of the ASIC.

4. The method of claim 3, wherein the resource constraints of the ASIC include buffer size information or priority queue information of the ASIC.

5. The method of claim 2, wherein the information includes Cost of Service (COS) constraints distributed across different ASIC instances.

6. The method of claim 1, wherein the information includes resource constraints of the switching hardware.

7. The method of claim 6, wherein the resource constraints identify bandwidth constraints of individual ports of the switching hardware.

8. The method of claim 7, wherein the bandwidth constraints identified on the switching hardware are static bandwidth constraints and dynamic bandwidth constraints.

9. The method of claim 1, wherein the information includes resource utilization and constraints in a physical network.

10. The method of claim 1, wherein the virtual Ethernet bindings are assigned during bringing up of a new virtual machine and the physical switch is part of a data center, the method further comprising a virtual machine controller querying the physical switch to access information on the physical switch.

11. The method of claim 1, wherein the information identifies a list of interfaces available to the virtual machine.

12. The method of claim 1, further comprising:
   identifying a plurality of switches in a layer 2 domain to which a virtual machine is to be bound;
   accessing each of the plurality of switches identified to obtain information on each associated physical switch; and
   mapping a plurality of virtual interfaces on each switch to routing hardware of the physical switch based on the information.

13. The method of claim 1, wherein the switching hardware includes a plurality of switch ASIC instances of the plurality of switches.

14. The method of claim 1, wherein the information includes a number and topology of physical paths associated with the virtual network interface.

15. A network device, comprising:
   an access module configured to access a switch to obtain information related to switching hardware of the switch;
   a selection module to select an uplink binding from a plurality of physical uplink bindings based on the information; and
   a mapping module to map a virtual network interface of a virtual machine to the selected uplink binding, wherein a list of candidate binding ports is identified based on the information and the list of candidate binding ports is communicated to the virtual machine.

16. The network device of claim 15, wherein the switching hardware includes an Application-Specific Integrated Circuit (ASIC) instance of the physical switch.

17. The network device of claim 16, wherein the information includes resource constraints of the ASIC.

18. The network device of claim 17, wherein the resource constraints of the ASIC include buffer size information or priority queue information of the ASIC.

19. A non-transitory machine-readable storage medium comprising instructions that, when executed by one or more processors of a machine, cause the machine to perform operations comprising:
   accessing a switch to obtain information related to switching hardware of the switch;
   selecting an uplink binding from a plurality of physical uplink bindings based on the information; and
   mapping a virtual network interface of a virtual machine to the selected uplink binding, wherein a list of candidate binding ports is identified based on the information and the list of candidate binding ports is communicated to the virtual machine.

20. A method of assigning virtual Ethernet bindings, the method comprising:
   accessing a switch to obtain information related to switching hardware of the switch;
   selecting an uplink binding from a plurality of physical uplink bindings based on the information; and
   mapping a virtual network interface of a virtual machine to the selected uplink binding,
   wherein the switching hardware includes an Application-Specific Integrated Circuit (ASIC) instance of the switch, and the information includes Cost of Service (COS) constraints distributed across different ASIC instances.

21. The method of claim 20, wherein the information includes a number and topology of physical paths associated with the virtual network interface.

22. A method of assigning virtual Ethernet bindings, the method comprising:
   accessing a switch to obtain information related to switching hardware of the switch;
   selecting an uplink binding from a plurality of physical uplink bindings based on the information; and
   mapping a virtual network interface of a virtual machine to the selected uplink binding, wherein the information includes resource constraints that identify bandwidth constraints of individual ports of the switching hardware.

23. The method of claim 22, wherein the switching hardware includes an Application-Specific Integrated Circuit (ASIC) instance of the switch.

24. The method of claim 22, wherein the bandwidth constraints identified on the switching hardware are static bandwidth constraints and dynamic bandwidth constraints.

* * * * *